United States Patent
McReynolds et al.

(10) Patent No.: US 6,687,095 B2
(45) Date of Patent: Feb. 3, 2004

(54) ROTATABLE ACTUATOR ARM HAVING AN INTEGRAL STRUT

(75) Inventors: Dave P. McReynolds, Loveland, CO (US); Steven R. Speckmann, Louisville, CO (US); George I. Brent, Boulder, CO (US); Gary F. Kelsic, Longmont, CO (US)

(73) Assignee: Seagate Technology LLC, Longmont, CO (US)

( * ) Notice: Subject to any disclaimer, the term of this patent is extended or adjusted under 35 U.S.C. 154(b) by 66 days.

(21) Appl. No.: 10/016,308

(22) Filed: Dec. 10, 2001

(65) Prior Publication Data

US 2003/0007294 A1 Jan. 9, 2003

Related U.S. Application Data

(60) Provisional application No. 60/303,609, filed on Jul. 5, 2001.

(51) Int. Cl.[7] .................................................. G11B 5/55
(52) U.S. Cl. ................................................... 360/265.8
(58) Field of Search .......................... 360/244.5, 244.9, 360/265, 264.9, 265.8, 265.9, 264.7, 266

(56) References Cited

U.S. PATENT DOCUMENTS

| | | | | |
|---|---|---|---|---|
| 3,544,980 A | | 12/1970 | Applequist et al. ....... 340/174.1 |
| 3,812,535 A | | 5/1974 | Higgins et al. ............. 360/103 |
| 4,774,610 A | | 9/1988 | Kinjo ......................... 360/104 |
| 4,996,616 A | | 2/1991 | Aoyagi et al. .............. 360/104 |
| 5,003,420 A | | 3/1991 | Hinlein ........................ 360/104 |
| 5,452,151 A | * | 9/1995 | Money et al. ................. 360/75 |
| 5,539,596 A | * | 7/1996 | Fontana et al. ........... 360/244.4 |
| 5,621,590 A | | 4/1997 | Pace et al. ................... 360/106 |
| 5,654,851 A | * | 8/1997 | Tucker et al. ............. 360/265.8 |
| 5,764,440 A | | 6/1998 | Forbord ....................... 360/106 |
| 5,790,348 A | * | 8/1998 | Alfred et al. ................ 360/265 |
| 5,805,387 A | | 9/1998 | Koester ....................... 360/106 |
| 5,862,019 A | | 1/1999 | Larson ........................ 360/106 |
| 5,898,544 A | * | 4/1999 | Krinke et al. ............ 360/264.5 |
| 5,936,805 A | * | 8/1999 | Imaino .................... 360/294.5 |
| 5,970,602 A | * | 10/1999 | Harada et al. ........... 29/603.06 |
| 5,986,852 A | * | 11/1999 | Berg et al. ............... 360/265.9 |
| 6,061,206 A | | 5/2000 | Foisy et al. ............... 360/265.7 |
| 6,088,192 A | | 7/2000 | Riener et al. ................ 360/104 |
| 6,108,174 A | * | 8/2000 | Adams ..................... 360/266.1 |
| 6,198,606 B1 | | 3/2001 | Boutaghou et al. ....... 360/294.3 |
| 6,208,485 B1 | | 3/2001 | Chainer et al. .......... 360/98.07 |
| 6,215,622 B1 | | 4/2001 | Ruiz et al. ................ 360/244.3 |
| 6,222,706 B1 | | 4/2001 | Stefansky et al. ....... 360/294.5 |
| 6,252,746 B1 | * | 6/2001 | Cho .......................... 360/265.8 |
| 6,507,463 B1 | * | 1/2003 | Boutaghou ............... 360/294.3 |
| 2001/0048574 A1 | * | 12/2001 | Bhattacharya et al. ... 360/244.2 |

\* cited by examiner

*Primary Examiner*—Brian E. Miller
(74) *Attorney, Agent, or Firm*—Westman, Champlin & Kelly

(57) ABSTRACT

An actuator arm for a rotary actuator assembly of a disc drive comprises a substantially planar sheet of pliable material defining a longitudinal actuator arm having longitudinal edges, a distal end supporting the transducer, a proximal end supporting an actuator coil. Strut means integral with the sheet extends substantially normal to the plane of the sheet along at least a portion of at least one longitudinal edge and the proximal end of the arm to provide rigidity to at least a portion of the arm. In one embodiment, an integral strut portion defines a support for the actuator coil. In another embodiment, integral strut portions extend along opposite longitudinal edges to a location proximal the distal end to define a rigid portion between the strut portions and a flexible suspension region distal to the rigid portion.

19 Claims, 5 Drawing Sheets

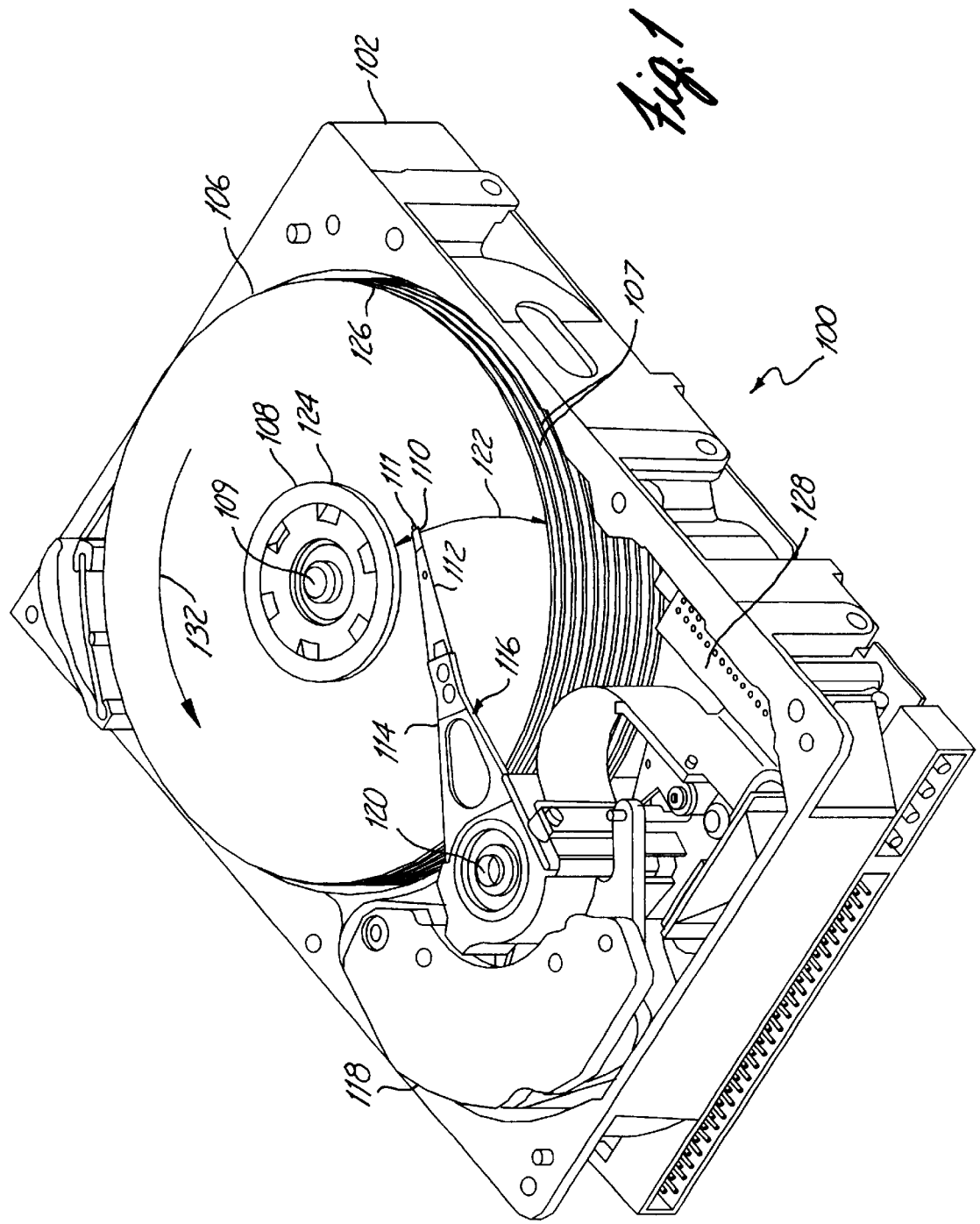

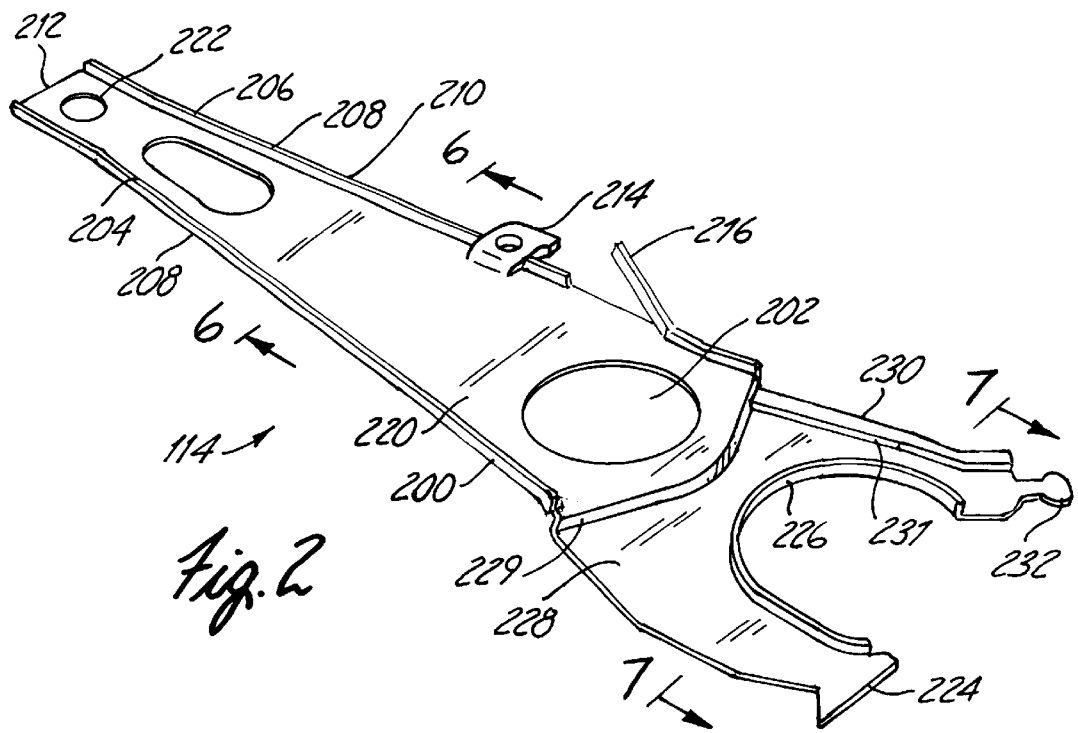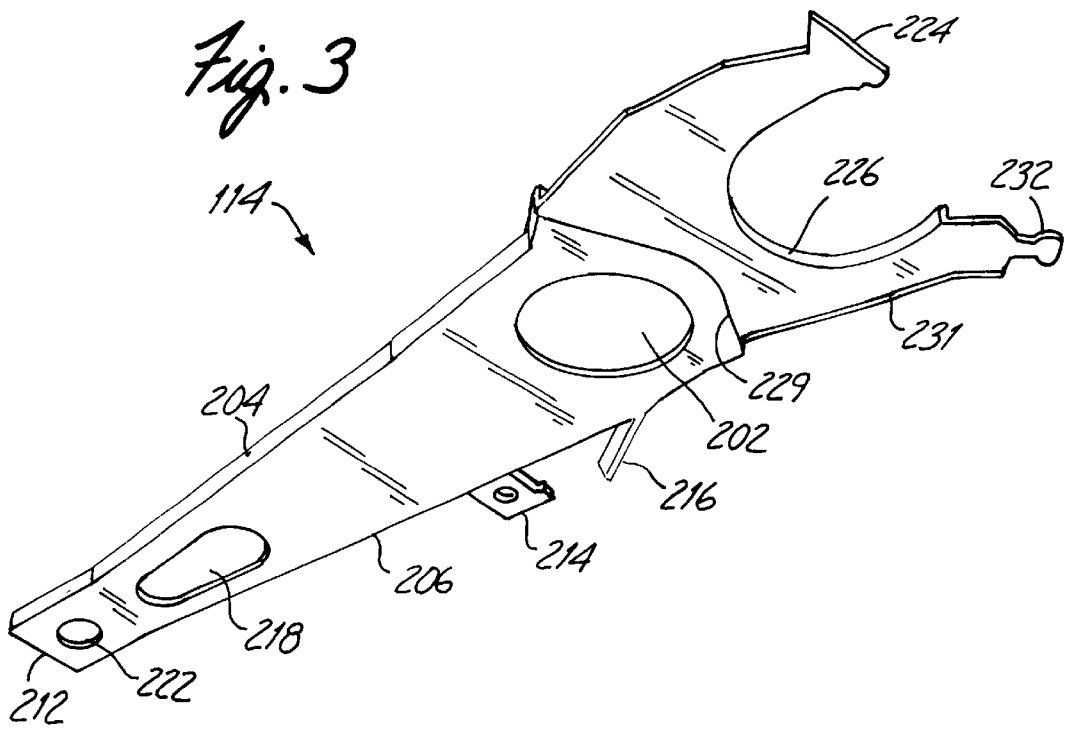

ROTATABLE ACTUATOR ARM HAVING AN INTEGRAL STRUT

CROSS-REFERENCE TO RELATED APPLICATION

This application claims priority of U.S. Provisional Application No. 60/303,609 filed Jul. 5, 2001 for "Sheet Metal Actuator".

FIELD OF THE INVENTION

This invention relates to actuator arms for data storage disc drives, and particularly to rigid actuator arms formed of pliable material, such as sheet metal, with integral struts arranged to support an actuator coil.

BACKGROUND OF THE INVENTION

Rotating disc data storage devices store data along concentric tracks of a rotatable disc. An actuator assembly positions a transducer adjacent a selected track to transfer data between the disc media and the transducer. Electrical conductors couple the transducer to external circuitry, such as a data processor, so that data may be transferred to the transducer to write data to the medium and so that data read from the from the medium by the transducer may be transferred from the transducer. The actuator assembly consists of a rigid actuator arm that is pivotably mounted to the frame of the disc drive, a flexible suspension at the distal end of the actuator arm, a transducer mounted to the flexible suspension to "fly" a predetermined distance from the rotating storage medium, and a motor that rotates the actuator arm about the pivot point to move the transducer across the tracks on the medium. The suspension is resilient to provide a force, or load, to counter the upward force imposed on the transducer by the air movement supporting the transducer as it flies adjacent the rotating medium.

It is important that the actuator assembly have minimum weight to minimize inertia that may adversely affect the response of the motor and arm to actuation signals to move the transducer across tracks of the medium. The arm of the actuator assembly must be sufficiently rigid so that impulse and acceleration forces on the arm during a track seek operation does not bend or distort the arm.

Presently, arms of actuator assemblies are constructed of sturdy, lightweight materials, such as aluminum and aluminum alloys, plastic, and metal encapsulated plastic. The flexible suspension is attached to a distal end of the arm, such as by fasteners, swaging, staking, etc. Additionally, support mechanisms are employed to attach the motor, such as a coil, to the proximal end of the arm. These attachment mechanisms add weight to the actuator assemblies, adversely affecting inertia. Moreover, these attachments often require multiple assembly steps, adding to the cost of the actuator assembly. The present invention provides a solution to these and other problems, and offers other advantages over the prior art.

SUMMARY OF THE INVENTION

In accordance with the present invention, an actuator arm for a rotary actuator assembly is arranged to position a transducer adjacent a track on a rotatable data storage medium of a disc drive to transfer data between the transducer and the medium. The actuator arm comprises a substantially planar sheet of pliable material defining a longitudinal actuator arm having longitudinal edges, a distal end for supporting the transducer, a proximal end supporting an actuator coil, and a bore hole through the sheet having an axis aligned with the pivot bearing axis. The bore hole is arranged to receive the pivot bearing on the disc drive so that the arm may pivot about the pivot bearing axis for arcuate movement of the transducer. A strut integral with the sheet extends substantially normal to the plane of the sheet along at least a portion of at least one longitudinal edge and/or the proximal end of the arm. The strut provides rigidity to at least a portion of the arm.

In one embodiment, the strut includes a first integral strut portion extending along at least a portion of at least one longitudinal edge of the arm and a second integral strut portion defining a support at the proximal end of the arm. The actuator coil is wrapped about the support on the sheet.

In another embodiment, the strut includes first and second strut portions that extend along opposite longitudinal edges of the arm from a region of the bore hole to a location proximal the distal end. The strut portions define a rigid portion between the strut portions and a flexible suspension region distal to the rigid portion.

Other features and benefits that characterize embodiments of the present invention will be apparent upon reading the following detailed description and review of the associated drawings.

BRIEF DESCRIPTION OF THE DRAWINGS

FIG. 1 is a perspective view of a disc drive in which aspects of the present invention may be practiced.

FIG. 2 is a top perspective view of an actuator arm in accordance with a first embodiment of the present invention.

FIG. 3 is a bottom perspective view of the actuator arm illustrated in FIG. 2.

DETAILED DESCRIPTION OF ILLUSTRATIVE EMBODIMENTS

Figure 4:
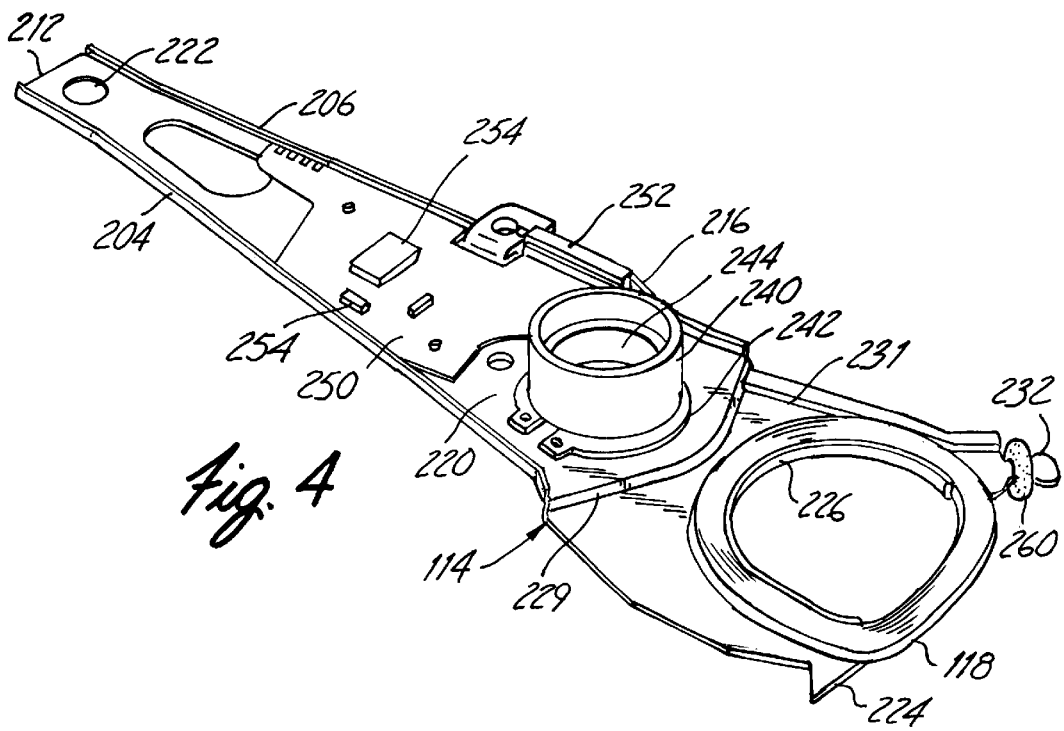
FIG. 4 is a top perspective view of an actuator assembly in accordance with an embodiment of the present invention employing the actuator arm illustrated in FIGS. 2 and 3.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108 for rotation in the direction of arrow 132. Disc pack 106 includes a plurality of individual discs 107, which are mounted for co-rotation about central axis 109. Each disc surface has an associated slider 110 that is mounted in disc drive 100 for communication with the confronting disc surface. Slider 110 is arranged to fly above the associated disc surface of an individual disc of disc pack 106, and carries a transducing head 111 arranged to write data to, and read data from, concentric tracks on the confronting disc surface. In the example shown in FIG. 1, sliders 110 are supported by suspensions 112 which are in turn attached to track accessing arms 114 of an actuator assembly 116. Actuator assembly 116 is driven by a voice coil motor (VCM) 118 to rotate the actuator assembly, and its attached sliders 110, about a pivot shaft 120. Rotation of actuator assembly 116 moves the heads along an arcuate path 122 to position the heads over a desired data track between a disc inner diameter 124 and a disc outer diameter 126.

Voice coil motor 118 is operated by position signals from servo electronics included on circuit board 128, which in turn are based on error signals generated by heads 111 and position signals from a host computer (not shown). Read and write electronics are also included on circuit board 128 to supply signals to the host computer based on data read from disc pack 106 by the read portions of heads 111, and to supply write signals to the write portions of heads 111 to write data to the discs.

FIGS. 2–7 illustrate an actuator arm 114 in accordance with a first embodiment of the present invention. Actuator arm 114 is formed by folding a single planar sheet 200 of pliable material, such as 0.005 to 0.010 inch thick No. 300 series steel. Sheet 200 includes a bore hole 202 that supports a portion of a pivot bearing mounted to base 102 (FIG. 1) so that actuator arm 114 may be rotated about axis 120. Longitudinal struts 204 and 206 are formed by bending the material of sheet 200 normal to the planar surface 220 of the sheet so that struts 204 and 206 extend along longitudinal edges 208 and 210 of arm 114, terminating at distal end 212. A flex cable bracket 214 and flex cable retention arm 216 are formed along one edge 210 of arm 114, again by bending the material of sheet 200 to form the bracket and arm. Usually, apertures, such as aperture 218, are formed through of sheet 200 for balance and weight purposes. Mounting hole 222 is formed though sheet 200 adjacent distal end 212 so that suspension 112 (FIG. 1) may be attached to arm 114, such as by a suitable adhesive, swage connection, rivet, etc.

The proximal end 224 of arm 114 includes strut 226 that is formed by folding the material of sheet 200 to extends upwardly from surface 228 of the proximal end. As shown in FIGS. 2–5, a step 229 between surfaces 220 and 228 may be included so that the elevation of surface 228 of the proximal end 224 is different from that of surface 220 at the distal end 212 for balance or other purposes. Additionally, a step 231 may establish a surface 230 at an elevation different from that of both surfaces 220 and 228 for purposes of supporting a flex circuit. A stop arm 232 may extend from proximal end 224 to define a limit of travel of arm 114 about axis 120 (FIG. 1).

The actuator arm shown in FIGS. 2 and 3 is formed from a single planar sheet 200 of resilient material that is cut to form the outline of arm 114, including struts 204, 206 and 226, bracket 214 and arms 216 and 232, and the various apertures, including bore hole 202, apertures 218 and mount hole 222. The sheet is bent to form the various elevations of surfaces 220, 228 and 230, as well as struts 206, 206 and 226.

Figure 5:
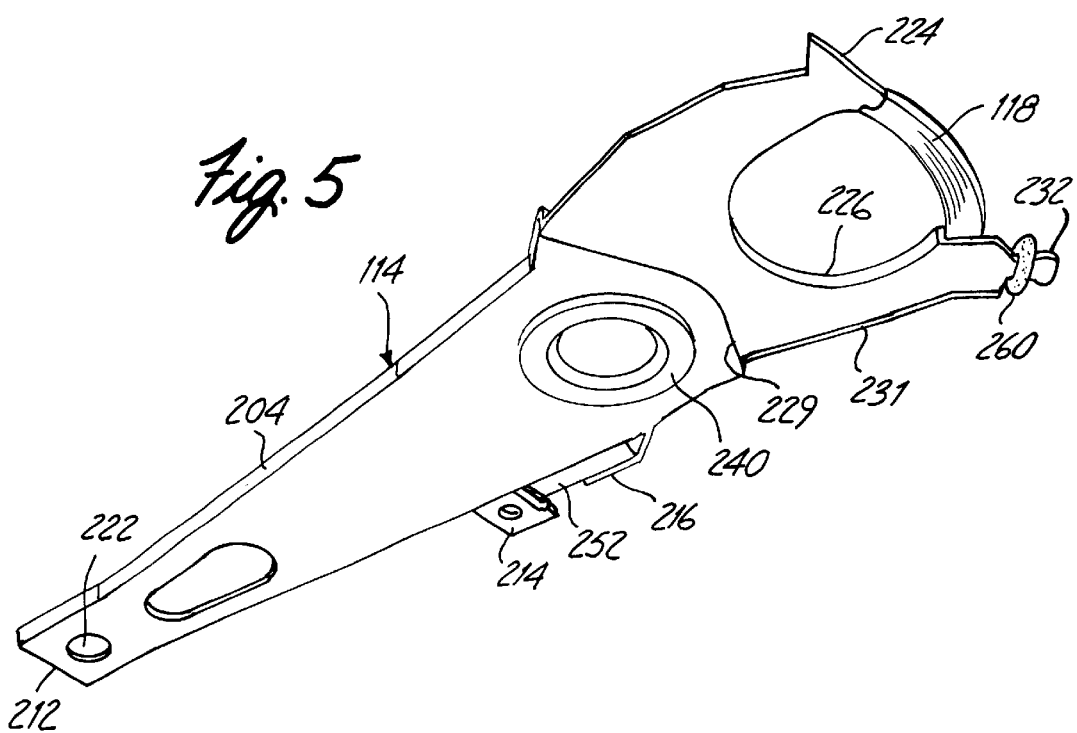
FIG. 5 is a bottom perspective view of the actuator assembly illustrated in FIG. 4.
Figure 6:
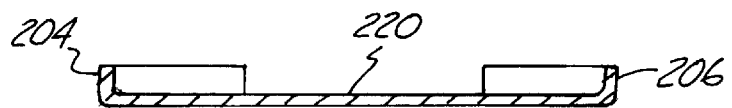
FIGS. 6 and 7 are section views taken at lines 6—6 and 7—7 respectively, in FIG. 2.
Figure 7:
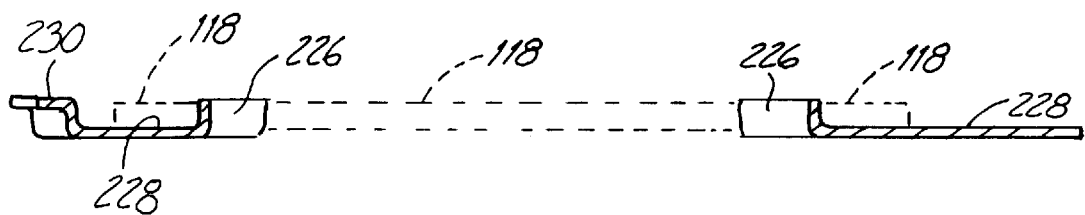

As shown particularly in FIGS. 4 and 5, actuator coil 118 is supported by strut 226 which forms a portion of a mandrel for winding the coil to the arm. An additional mandrel (not shown) may be employed to support the coil during the winding procedure. In preferred embodiments, after the coil is wound onto strut 226 (and any additional mandrel), coil 118 is heated so that insulation on the coil windings adhesively fastens the coil to strut 226. If an additional mandrel is employed to form coil 118, it is removed after the coil is attached to the arm.

A pivot bearing includes a member 240 that extends through bore hole 202 and is fastened to arm 114 by a suitable C-clip 242. Member 240 includes an aperture 244 that receives a shaft 246 (FIG. 1) mounted to housing 102 (FIG. 1) of the disc drive. Member 240 and shaft 246 form the pivot bearing to permit rotation of arm 114 about axis 120.

Flex circuit 250 is attached to arm 114 by nesting a portion of the flex circuit on surface 220 between struts 204 and 206. Flex circuit is held in place between bracket 214 and arm 216. As shown particularly in FIGS. 4 and 5, after the flex circuit is nested in place, arm 216 is bent to sandwich a portion 252 of flex circuit 250 between arm 216 and the edge 210 of arm 114. Flex circuit 250 may carry circuit members 254, such as a preamplifier, resistors, etc. in a customary manner. Flex circuit 250 includes a portion 256 that attaches to circuit 128 (FIG. 1).

A resilient stop member 260 is fastened to stop arm 232 to define a limit of travel of actuator arm 114 by striking a stop (not shown) on base member 102 when arm 114 reaches its design travel limit (e.g., when head 111 is positioned adjacent the innermost or outermost track). The resiliency of member 260 and of arm 232 is such as to absorb shock when striking the stop to prevent vibration in arm 114.

Figure 8:
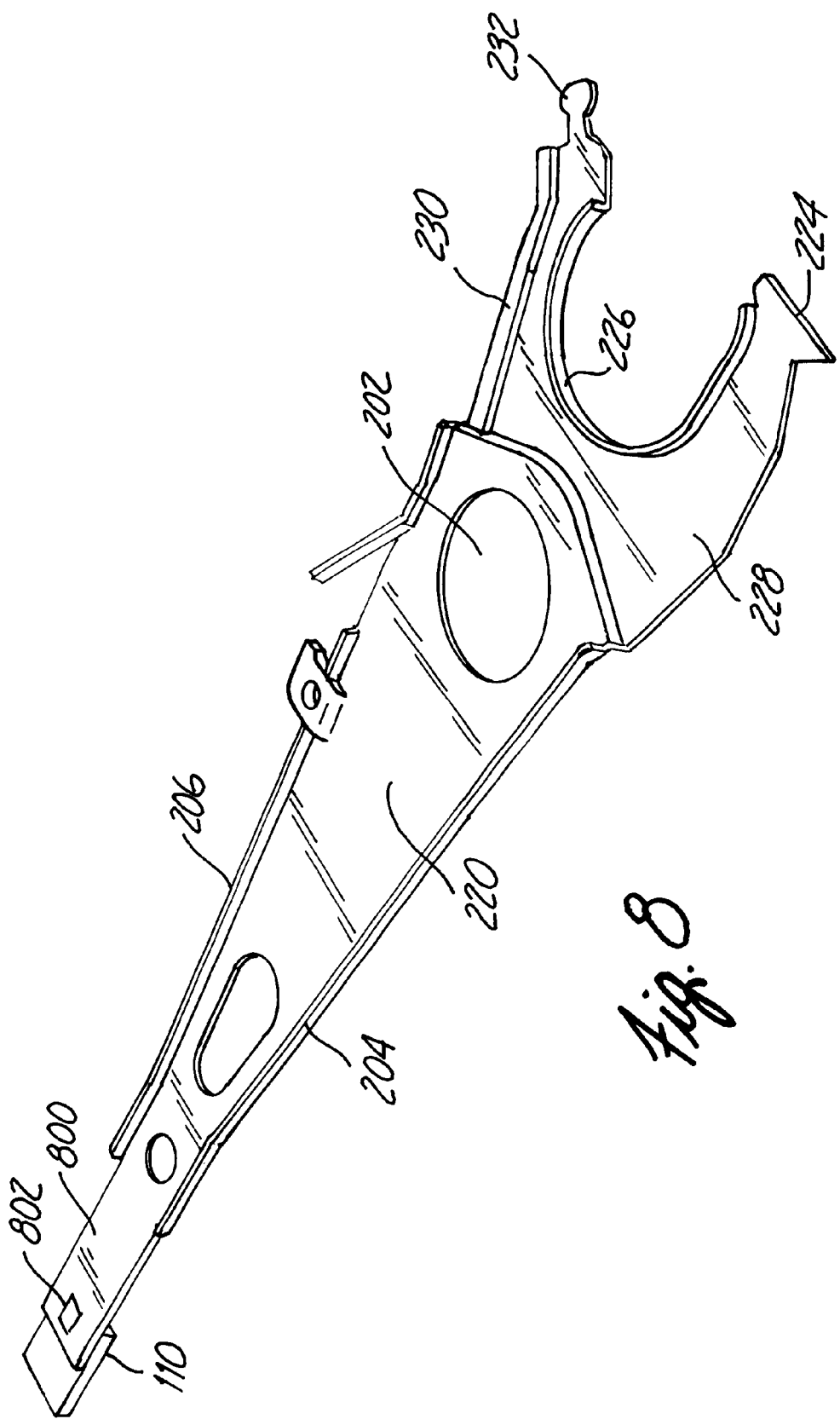
FIG. 8 is a top perspective view, as in FIG. 2, of an actuator arm in accordance with a second embodiment of the present invention.

FIG. 8 illustrates a modification of the actuator arm where instead of attaching a separate suspension 112 to the distal end of the arm as in the embodiment of FIGS. 2–7, flexible sheet 200 extends distally of struts 204 and 206 to form a suspension region 800 that is integral with arm 114 that distally supports slider 110. This embodiment offers the advantage of employing the resilient sheet 200 to form an integral suspension, thereby eliminating the separate attachment of the suspension and its required mount structure 222. Consequently, slider 110 is fastened directly to flexible suspension region 800 of arm 114 by suitable fastening structures such as adhesive, swaging, etc.

In some cases it may be desirable to integrate a microactuator in the arm for fine positioning of the transducer on slider 110 relative to a track. Microactuators are well know for this purpose and may be incorporated in the rigid portion of the arm, between the rigid portion and the suspension portion or between the suspension portion and the slider. As an example, a microactuator 802 may be formed from the planar material forming arm 114 and suspension 800 as described in U.S. Pat. No. 6,198,606 granted Mar. 6, 2001 to Boutaghou et al. for "Disc Drive Actuation System having an Injected Molded Magnetic Micro-Actuator with Metal Beam Inserts and its Method of Fabrication" and assigned to the same Assignee as the present invention.

Although the present invention has been described with reference to magnetic disc drives, those skilled in the art will recognize that the present invention may be practiced with other system modifications, including but not limited to optical disc drives and systems employing other technologies requiring rigid or semi-rigid positioning arms, such as sensors, switch actuators and the like.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for the actuator assembly while maintaining substantially the same functionality without departing from the scope and spirit of the present invention. For example, while the invention is described as employing 300 series steel sheets for the actuator arm, other materials, such as plastic, metal alloys and the like may be used to achieve the described rigidity. In addition, although the actuator assembly is described as employing various optional features integral with the actuator arm, such as a microactuator, a flex circuit holding finger and a stop extension, it will be appreciated by those skilled in the art that the teachings of the present invention can be applied to actuator assemblies without these optional features, to actuator assemblies having some or all of these features, as well as to actuator assemblies having other features not specifically herein described, without departing from the scope and spirit of the invention.

What is claimed is:

1. An actuator arm for a rotary actuator assembly arranged to position a transducer adjacent a track on a rotatable data storage medium of a disc drive to transfer data between the transducer and the medium, the disc drive including a pivot bearing having an axis, the actuator arm comprising:

a substantially planar sheet of pliable material defining a longitudinal actuator arm having longitudinal edges, a distal end for supporting the transducer, a proximal end supporting an actuator coil, and a bore hole through the sheet having an axis aligned with the pivot bearing axis, the bore hole being arranged to receive the pivot bearing so that the arm may pivot about the pivot bearing axis for arcuate movement of the transducer; and strut means integral with the sheet and extending substantially normal to the plane of the sheet along at least a portion of at least one longitudinal edge and the proximal end of the arm and so disposed and arranged as to provide rigidity to at least a portion of the arm.

2. The actuator arm of claim 1, wherein the strut means includes:

a first integral strut portion extending along at least a portion of at least one longitudinal edge of the arm, and a second integral strut portion defining a support at the proximal end of the arm so that the actuator coil is wrapped about the support on the sheet.

3. The actuator arm of claim 2, wherein the arm has a generally tapered shape extending longitudinally from a wide portion in a region of the bore hole to a narrow portion adjacent the transducer, and the first integral strut includes first and second strut portions extending along opposite longitudinal edges of the arm.

4. The actuator arm of claim 3, wherein the first and second strut portions terminate proximal to the distal end to define a resilient suspension region at the distal end of the arm.

5. The actuator arm of claim 1, wherein the sheet further includes at least one bracket portion extending from an edge of the arm, the actuator assembly further including:

a flex circuit supported by the sheet and retained by the at least one bracket portion, the flex circuit being connected to the transducer.

6. The actuator arm of claim 1, wherein the sheet further includes an extension, the actuator assembly further including:

a resilient stop mechanism mounted to the extension.

7. The actuator arm of claim 1, further including a microactuator having a stator, a rotor and a plurality of suspension beams integrally formed in the sheet between the distal end and the bore hole, the transducer being supported by the rotor.

8. The actuator arm of claim 7, further including:

an electric motor for moving the rotor relative to the stator, and a flex circuit supported by the sheet, the flex circuit being connected to the transducer and to the electric motor.

9. The actuator arm of claim 8, wherein the sheet further includes at least one bracket portion extending from an edge of the arm, the flex circuit being supported by the at least one bracket portion.

10. The actuator arm of claim 1, wherein the strut means includes:

first and second strut portions extending along opposite longitudinal edges of the arm from a region containing the bore hole to locations proximal the distal end to define a rigid portion between the first and second strut portions and a flexible suspension region distal to the rigid portion.

11. The actuator arm of claim 10, wherein the arm has a generally tapered shape extending longitudinally from a wide portion in the region of the bore hole to a narrow portion at the distal end.

12. Data storage apparatus comprising:

a housing;

a rotatable data storage medium supported by the housing and having a plurality of concentric tracks on which data may be stored;

a pivot bearing supported by the housing, the pivot bearing having an axis; an actuator arm comprising a substantially planar sheet of pliable material defining a longitudinal member having longitudinal edges, a distal end and a proximal end, the longitudinal member being mounted to the pivot bearing for rotational movement about the pivot bearing;

a transducer supported at the distal end of the longitudinal member for transferring data between the transducer and the medium;

an actuator coil mounted to the proximal end of the longitudinal member for moving the actuator arm about the pivot bearing axis; and a strut integral with the sheet and extending substantially normal to the plane of the sheet along at least a portion of at least one longitudinal edge and the proximal end of the arm, the strut being so disposed and arranged as to provide rigidity to at least a portion of the arm.

13. The apparatus of claim 12, wherein the strut includes:

a first integral strut portion extending along at least a portion of at least one longitudinal edge of the arm, and a second integral strut portion defining a support at the proximal end of the arm so that the actuator coil is wrapped about the support on the sheet.

14. The apparatus of claim 12, wherein the arm has a generally tapered shape extending longitudinally from a wide portion in a region of the bore hole to a narrow portion adjacent the transducer, and the strut includes first and second strut portions extending along opposite longitudinal edges of the arm and terminating proximal to the distal end to define a resilient suspension region at a distal end of the arm.

15. The apparatus of claim 12, wherein the sheet further includes at least one bracket portion extending from an edge of the arm, the actuator assembly further including:

a flex circuit supported by the sheet and retained by the at least one bracket portion, the flex circuit being connected to the transducer.

16. The apparatus of claim 12, wherein the sheet further includes an extension, the actuator assembly further including:

a resilient stop mechanism mounted to the extension.

17. The apparatus of claim 12, further including a microactuator having a stator, a rotor and a plurality of suspension beams integrally formed in the sheet between the distal end and the bore hole, the transducer being supported by the rotor.

18. The apparatus of claim 17, further including:

an electric motor for moving the rotor relative to the stator, and a flex circuit supported by the sheet, the flex circuit being connected to the transducer and to the electric motor.

19. The apparatus of claim 12, wherein the strut includes:

first and second strut portions extending along opposite longitudinal edges of the arm from a region containing the bore hole to locations proximal the distal end to define a rigid portion between the first and second strut portions and a flexible suspension region distal to the rigid portion.

* * * * *

UNITED STATES PATENT AND TRADEMARK OFFICE
CERTIFICATE OF CORRECTION

PATENT NO. : 6,687,095 B2
DATED : February 3, 2004
INVENTOR(S) : McReynolds et al.

It is certified that error appears in the above-identified patent and that said Letters Patent is hereby corrected as shown below:

<u>Title page,</u>
Item [73], Assignee, change "Longmont, CO" to -- Scotts Valley, CA --.

Signed and Sealed this

Fourth Day of May, 2004

JON W. DUDAS
*Acting Director of the United States Patent and Trademark Office*